United States Patent
Dong et al.

(10) Patent No.: US 12,220,079 B1
(45) Date of Patent: Feb. 11, 2025

(54) TITANIUM NON-STICK PAN

(71) Applicant: TIBET SUNTRUE HOUSEWARE TECH CO., LTD., Tibet (CN)

(72) Inventors: Xuelu Dong, Tibet (CN); Xucai Tu, Tibet (CN)

(73) Assignee: TIBET SUNTRUE HOUSEWARE TECH CO., LTD., Lhasa (CN)

(*) Notice: Subject to any disclaimer, the term of this patent is extended or adjusted under 35 U.S.C. 154(b) by 0 days.

(21) Appl. No.: 18/917,059

(22) Filed: Oct. 16, 2024

Related U.S. Application Data (63) Continuation of application No. PCT/CN2024/108776, filed on Jul. 31, 2024.

(30) Foreign Application Priority Data

Jul. 31, 2023 (CN) .......................... 202310962570.8

(51) Int. Cl.
*A47J 36/02* (2006.01)
*B32B 1/00* (2024.01)
(Continued)

(52) U.S. Cl.
CPC ............ *A47J 36/025* (2013.01); *B32B 1/00* (2013.01); *B32B 3/12* (2013.01); *B32B 15/043* (2013.01);
(Continued)

(58) Field of Classification Search
CPC ......... B65D 1/40; B32B 15/043; B32B 15/04; B32B 15/00; B32B 1/00; B32B 3/12;
(Continued)

(56) References Cited

U.S. PATENT DOCUMENTS 3,211,325 A * 10/1965 Wisnicki ................... C23C 4/18
159/DIG. 13
3,271,653 A * 9/1966 Wolf ......................... C23C 4/08
220/573.2
(Continued)

FOREIGN PATENT DOCUMENTS

CN 1197850 A * 11/1998 .............. A47J 37/10
CN 103462513 A 12/2013
(Continued)

OTHER PUBLICATIONS

International Search Report in counterpart International Application No. PCT/CN2024/108776, dated Oct. 9, 2024, 4 pages (Machine Translation Provided).
(Continued)

*Primary Examiner* — Robert J Hicks
(74) *Attorney, Agent, or Firm* — Wentsler LLC (57) ABSTRACT

A titanium non-stick pan including a pan body. A base material of the pan body being a metal composite plate with a multi-layer composite structure that includes a base metal layer and a titanium metal layer arranged in a stack. The base metal layer is bonded to the titanium metal layer by metallurgical bonding. The titanium metal layer forms a concave-convex structure of a uniform thickness. The concave-convex structure includes a plurality of interconnected concave-convex unit cells, each of which includes first convex parts and a concave part enclosed by the first convex parts. The concave part includes a second convex part disposed in the concave part. The second convex part has a top lower than each first convex part, and a surface of the titanium metal layer at the concave-convex structure forms an oxidation layer with a thickness between 8 μm and 40 μm.

10 Claims, 9 Drawing Sheets

(51) Int. Cl.
*B32B 3/12* (2006.01)
*B32B 15/04* (2006.01)
*B32B 15/20* (2006.01)
*C25D 11/02* (2006.01)
*C25D 11/26* (2006.01)

(52) U.S. Cl.
CPC .............. *B32B 15/20* (2013.01); *C25D 11/026* (2013.01); *C25D 11/26* (2013.01); *B32B 2255/06* (2013.01); *B32B 2255/20* (2013.01); *B32B 2307/7376* (2023.05)

(58) Field of Classification Search
CPC .............. B32B 3/10; B32B 2307/7376; B32B 2307/7375; B32B 2307/737; B32B 2255/20; B32B 2255/06; A47J 36/025; A47J 36/02; A47J 36/00; A47J 27/00; C25D 11/026; C25D 11/02; C25D 11/26; Y10S 220/912
USPC ......... 220/573.2, 573.1, 573.3, 62.17, 62.13, 220/912; 427/249.19, 255.32, 255.36
See application file for complete search history.

(56) References Cited

U.S. PATENT DOCUMENTS

| | | | | |
|---|---|---|---|---|
| 4,162,334 A | * | 7/1979 | Crandall | A47J 36/04 426/523 |
| 5,252,360 A | * | 10/1993 | Huttl | B41N 3/003 427/419.7 |
| 6,248,435 B1 | * | 6/2001 | Leck | B05D 3/207 428/323 |
| 2008/0237241 A1 | * | 10/2008 | Buffard | A47J 36/025 220/573.2 |
| 2010/0001006 A1 | * | 1/2010 | Workens | A47J 36/02 220/573.2 |
| 2011/0192850 A1 | * | 8/2011 | Le Bris | A47J 36/025 220/573.2 |

FOREIGN PATENT DOCUMENTS

| | | | | |
|---|---|---|---|---|
| CN | 103783999 A | | 5/2014 | |
| CN | 104887060 A | * | 9/2015 | .............. A47J 27/00 |
| CN | 204813328 U | | 12/2015 | |
| CN | 107374318 A | * | 11/2017 | .............. B23K 35/24 |
| CN | 209202802 U | | 8/2019 | |
| CN | 210446632 U | | 5/2020 | |
| CN | 111387795 A | | 7/2020 | |
| CN | 115581394 A | | 1/2023 | |
| CN | 115778164 A | | 3/2023 | |
| CN | 116141772 A | | 5/2023 | |
| CN | 116833243 A | | 10/2023 | |
| KR | 20090098398 A | * | 9/2009 | .............. A47J 36/02 |
| WO | WO-2010023402 A1 | * | 3/2010 | .............. A47J 36/02 |

OTHER PUBLICATIONS

Written Opinion in counterpart International Application No. PCT/CN2024/108776, dated Oct. 9, 2024, 5 pages (Machine Translation Provided).

Office Action in counterpart Chinese Patent Application No. 202411239755.7, dated Oct. 24, 2024, 6 pages (Machine Translation Provided).

Office action in counterpart Chinese Patent Application No. 202411239755.7, dated Nov. 23, 2024, 5 pages (Machine Translation Provided).

* cited by examiner

TITANIUM NON-STICK PAN

CROSS-REFERENCE TO RELATED APPLICATIONS

This application is a continuation application of International Application Serial No. PCT/CN2024/108776, filed on Jul. 31, 2024, which claims priority to Chinese Patent Application No. 202310962570.8, filed on Jul. 31, 2023, the full disclosure of which is incorporated herein by reference.

TECHNICAL FIELD

The present disclosure relates to the technical field of cookers, and specifically relates to a titanium non-stick pan.

BACKGROUND

Current cookers are mainly made of composite plates, for example, composite plates formed by metallurgical bonding of multi-layer metals such as three-layer steel composite plate, steel-aluminum composite plate and the like. To achieve the non-stick effect and provide a protective coating, the pan made of a composite plate generally has convex and concave surfaces, where a non-stick coating is provided in a recess of the concave surface, while the convex surface contacts a spatula, and the non-stick performance of such pans is closely correlated with a ratio of the convex and concave surfaces.

To achieve the non-stick effect and provide a protective coating, the pan made of a composite plate generally has convex and concave surfaces, where the recess is typically formed by etching, but the process of corroding and etching a metal with a solution to produce a concave surface is not environmentally friendly.

In the related art, there is a processing method of pressing concave-convex patterns on the purchased metal sheet by a pressing machine to process a pan, but such a pan is still not good enough in terms of the non-stick performance, and consumers still expect further improvement in the non-stick performance.

Titanium is widely used in the manufacture of kitchenware due to a light weight, high strength, excellent corrosion resistance, and the like. To improve the non-stick performance, the existing titanium pan is generally processed by etching to produce a concave-convex structure on an inner surface of the pan body. However, due to the relatively stable metal characteristics of titanium, common etching solutions are noneffective and a strong acid solution is necessary for treatment, which is not only costly, but also brings about safety and health risks to workers working in such an environment for a long time. In addition, most method for manufacturing a titanium pan by etching require thicker materials, such as a titanium material with a thickness of at least 0.4 mm or above, and the etched recess has a thickness around 0.2 mm. It can be seen that the use of the strong acid solution for etching the concave-convex structure will remove the material in the pan body, which will not only cause waste of titanium, but also result in a thinner recess that tends to break when the pan body is stretched into shape later.

In addition, in use, the concave-convex structure in the existing non-stick pan still has the problem that food of a smaller size may enter the recess since food varies in size, resulting in blocked blind holes and possible food stuck in the unit cells, thereby affecting the non-stick effect of the pan.

Therefore, it is necessary to design a method for manufacturing a non-stick pan, as well as a titanium non-stick pan, that can be easily implemented and have an ensured good physical non-stick effect.

SUMMARY

The present disclosure aims to solve, to some extent, one of the technical problems in the related art. To this end, the present disclosure provides a titanium non-stick pan which have further improved non-stick performance.

The present disclosure provides a titanium non-stick pan, including a pan body, where a base material of the pan body is a metal composite plate with a multi-layer composite structure including a base metal layer and a titanium metal layer arranged in a stack, the base metal layer is bonded to the titanium metal layer by metallurgical bonding, the titanium metal layer has a thickness between 0.25 mm and 0.4 mm, and forms a concave-convex structure of a uniform thickness, the concave-convex structure includes a plurality of interconnected concave-convex unit cells, each of which includes first convex parts protruding from an inner surface of the pan body and a concave part enclosed by the first convex parts, the concave part includes a second convex part disposed in the concave part, the second convex part has a top lower than each first convex part, and a surface of the titanium metal layer at the concave-convex structure forms an oxidation layer with a thickness between 8 μm and 40 μm.

In this technical solution, the titanium metal layer is provided as the inner layer of the pan body, so that the weight of the pan body can be reduced in terms of the material of the pan body, and the strength and corrosion resistance of the pan body are improved; and the concave-convex structure is provided on the titanium metal layer to improve the non-stick effect of the inner surface of the pan body. In addition, the concave-convex structure on the titanium metal layer has a uniform thickness, which is different from the pan body manufactured by etching in the related art, and avoids the problems of waste of titanium and reduced pan body strength.

Moreover, the thickness of the titanium metal layer in this technical solution is only 0.25 mm to 0.4 mm, which, compared with the thickness (at least 0.4 mm) of a titanium pan processed by a traditional etching method, saves the titanium consumption by 12.5% to 37.5%, and significantly reduces the production cost.

In this technical solution, the concave-convex structure is provided with first convex parts, a concave part and a second convex part in the concave part, so that, in use, the second convex part can prevent solid food from contacting the non-stick layer in a unit cell formed by the patterns. Further, the second convex part lower than the first convex part can form a concave arc between the two, and since the non-stick property of the non-stick pan is based on the aerodynamic principle and most food is in special shapes, the arcuate unit cells can be better sealed by the food. The non-stick layer generates hot air or gaps filled with edible oil, to form a three-dimensional space for locking the oil and storing air, so that the food can be better supported and prevented from blocking the concave part, thereby improving the non-stick effect. Meanwhile, the first convex part, the concave part and the second convex part are formed on the surface of the pan body to reduce a contact area between food and the surface of the pan body, so as to reduce a friction force between the food and the surface of the pan body and further improve the non-stick effect.

Further, the oxidation layer includes a first oxidation layer formed on bottom and side surfaces of the concave part and top and side surfaces of the second convex part, and a second oxidation layer formed on top surfaces of the first convex parts. The first oxidation layer has a thickness between 20 µm and 40 µm, and the second oxidation layer has a thickness between 8 µm and 20 µm. The surface of each first convex part is polished after being oxidized, which can improve the quality of the inner surface of the pan body and enhance the abrasion resistance. The first convex parts higher than the concave part can prevent the oxidation layer in the concave part from being polished, and ensure a better non-stick effect of the concave part.

Furthermore, projections are formed on a surface of the base metal layer, and the metallurgical bonding of the base metal layer and the titanium metal layer enables the projections on the surface of the base metal layer to form a mortise and tenon joint structure nested with each other with the concave-convex structure of the titanium metal layer. In this manner, a better bonding force can be achieved between the two metals, the overall effect of the pan body can be improved, and the titanium consumption can be reduced.

Further, the first convex parts each have a width between 0.2 mm and 0.5 mm and a height between 0.08 mm and 0.25 mm, while the concave part has a radial dimension between 2.5 mm and 3.5 mm.

Further, the oxidation layer is a titanium dioxide layer formed by micro-arc oxidation on the surface of the titanium metal layer, a structure of a plurality of pores is formed inside the oxidation layer, and at least part of the pores are communicated with each other. The titanium dioxide layer formed by micro-arc oxidation on the surface of the titanium metal layer is typically thicker and has intricate pores inside, where the pores may be communicated with each other and store more oil molecules, and air in the pores may be thermally expand after heating, leading to a better non-stick effect of the pan body.

Further, the first convex parts take a proportion less than 20% relative to a total area of the concave-convex structure, and the concave part takes a proportion not less than 80% relative to a total area of the concave-convex structure. The proportions of the first convex part and the concave part are controlled so that the areas of the concave part and the non-stick region are guaranteed, thereby improving the non-stick effect.

Furthermore, the second convex part is disposed at a central position of the concave part, and has a radial dimension between 0.15 mm and 0.2 mm, and a height lower than each first convex part by 0.05 mm to 0.1 mm.

Furthermore, the multi-layer composite structure of the pan body is a titanium-aluminum composite structure; or the multi-layer composite structure of the pan body is a titanium-aluminum-steel composite structure, and the base metal layer is located between a titanium metal layer and a steel metal layer.

Further, the concave part enclosed by the first convex parts is shaped into a circle or a regular polygon.

Further, tops of each first convex part and/or the second convex part are configured as pointed ends. In this manner, the contact area between food and the pan body is further reduced, and the non-stick effect is further improved.

These features and advantages of the present disclosure will be disclosed in more detail in the following detailed description and the accompanying drawings. The best mode or means for implementing the present disclosure will be described in detail with reference to the accompanying drawings, but the present disclosure is not limited thereto. In addition, each of these features, elements and components appearing in the following description and in the drawings represent a plural form, and different symbols or numerals are labeled for convenience of representation, but all represent components of the same or similar construction or function.

BRIEF DESCRIPTION OF DRAWINGS

The present disclosure will be further described below in conjunction with the drawings.

In the drawings: 1. metal sheet; 2. heating furnace; 3. rolling machine; 4. knurling machine; 5. metal composite plate; 51. first surface; 52. second surface; 53. convex part; 54. concave part; 10. pan body; 11. titanium metal layer; 12. base metal layer; 13. steel metal layer; 14. first convex part; 15. concave part; 16. second convex part; 17. oxidation layer; 171. first oxidation layer; 172. second oxidation layer; 173. pore; 18. handle; and 19. flange.

DETAILED DESCRIPTION OF EMBODIMENTS

The embodiments of the present disclosure will now be described in detail with the examples thereof shown in the drawings throughout which, the same or similar reference signs refer to the same or similar elements or elements with the same or similar functions. The embodiments based on the implementations are intended to explain the present disclosure and should not be interpreted as limiting the present disclosure.

Reference in the description to "one embodiment" or "an example" or "instance" means that a particular feature, structure, or characteristic described in connection with the embodiment itself may be included in at least one embodiment of the patent disclosure. The appearances of the phrase "in one embodiment" in various places of the description are not necessarily all referring to the same embodiment.

Embodiments

Figure 1:
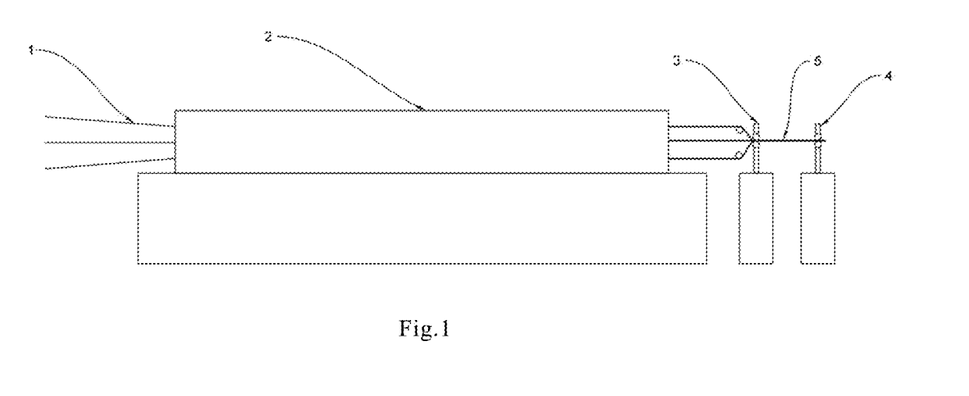
FIG. 1 is a schematic diagram of processing a metal composite plate according to an embodiment of the present disclosure.

As shown in FIG. 1, this embodiment provides a method for manufacturing a non-stick pan, which includes the following steps S1 to S6:

S1, surface pretreatment. At least two rectangular or square metal sheets 1 are selected to manufacture a metal composite plate 5 with a multi-layer composite structure. The number of the metal sheets 1 may be two, three, four and the like. The metal sheets 1 may be one or more of stainless steel plates, iron plates, aluminum plates or titanium plates, and the metal sheets 1 of adjacent layers may be homogeneous metal sheets or heterogeneous metal sheets. The selected metal sheets 1 are subjected to surface pretreatment. In other words, surfaces of the metal sheets 1 are cleaned to remove oil stains, oxides and the like on the surfaces of the sheets.

In addition, the selected metal sheets 1 may have the same size for easy processing. To improve the non-stick performance of the pan made of the metal composite plate 5, a titanium plate with excellent performance may be used as an inner layer of the metal composite plate 5, while an aluminum plate or a stainless steel plate may be used as an outer layer or an intermediate layer of the metal composite plate 5 to reduce the production cost.

S2, stacking. The cleaned metal sheets 1 are stacked one on top of another after the surface pretreatment, and four end corners of each metal sheet 1 are aligned. To prevent subsequent misalignment of the metal sheets 1, the end corners of the metal sheets 1 may be fixed, for example, by spot welding or the like, to avoid dislocation of the metal sheets 1 after rolling.

S3, heating. The stacked and aligned metal sheets 1 are placed into a heating furnace 2 synchronously through a transmission belt, where a temperature of the heating furnace 2 is set between 300° C. and 500° C. In this temperature range, most metals such as iron and aluminum are in a softening state and can be easily processed subsequently. It should be noted that the next procedure should be performed within a short time after heating, so as to prevent the metal sheets 1 from cooling and hardening, which may affect subsequent processing.

Figure 2:
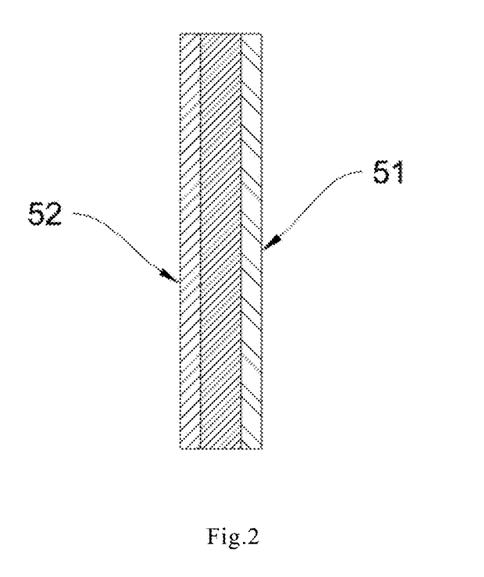
FIG. 2 is a longitudinal sectional view of a metal composite plate according to an embodiment of the present disclosure.
Figure 3:
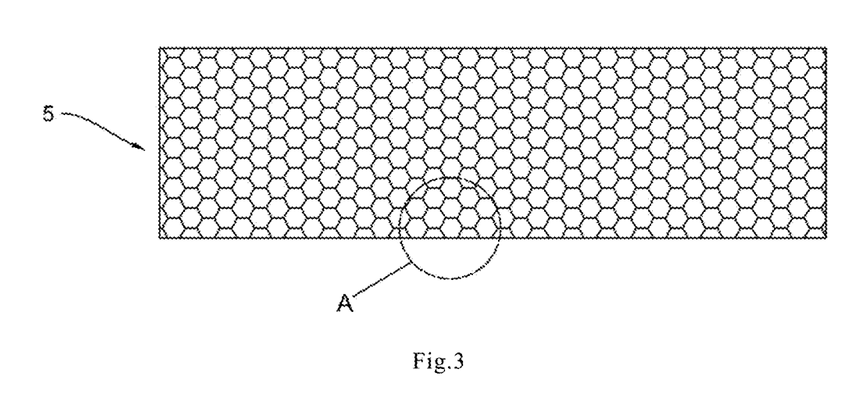
FIG. 3 is a top view of a metal composite plate according to an embodiment of the present disclosure.

S4, rolling. In this embodiment, a knurling machine 4 with two rollers is used to process the softened metal sheets 1, where a pressure of the knurling machine 4 is set between 100 t and 1000 t. The stacked and aligned metal sheets 1 are rolled by the rollers, and the heated and softened metal sheets 1 are compounded into a whole, as shown in FIG. 2, to form a metal composite plate 5 with a first surface 51 and a second surface 52 opposite to each other. Meanwhile, at least one roller of the knurling machine 4 is provided with a concave-convex pattern, and when the metal sheets 1 are rolled by the roller, as shown in FIG. 3, the concave-convex pattern on the roller will be printed on the first surface 51 or the second surface 52 of the metal composite plate 5 to form a concave-convex structure. When a pan is subsequently manufactured, the surface with the concave-convex structure is used as an inner surface of the pan. The knurling procedure is performed simultaneously with the rolling and compounding procedure, thereby reducing the production cost and increasing the efficiency.

In other embodiments, the rolling machine 3 and the knurling machine 4 may also be used for processing. Specifically, the metal sheets 1 arranged in a stack are firstly placed into the rolling machine 3 for rolling at a pressure between 100 t and 1000 t; and then, the metal composite plate 5 obtained by rolling and compounding is placed into the knurling machine 4 for knurling. The knurling machine 4 is provided with at least one roller with a concave-convex pattern so that the pattern can be printed onto the metal composite plate 5. It should be noted that the metal composite plate 5 is immediately placed into the knurling machine 4 after being processed by the rolling machine 3, so as to prevent the metal composite plate 5 from being cooled and hardened, which may degrade the pattern processing effect. Specifically, the metal composite plate 5 passes through the knurling machine 4 at a temperature controlled between 220° C. and 400° C. In this manner, a uniform heating temperature in the knurling procedure and the rolling procedure is guaranteed, the processed concave-convex pattern is more uniform, and the pattern has a more uniform size, depth, and thickness.

In addition, concave-convex structures may be formed on both the first surface 51 and the second surface 52 of the metal composite plate 5 by simply replacing the roller type used in the patterning tool, which is easy to operate and can save the cost.

S5, annealing. The metal composite plate 5 is annealed. Preferably, the annealing is performed under a protective reducing atmosphere or in a vacuum environment.

In step S51, the metal composite plate 5 is made into a roll or cut into webs of desired shapes and sizes. Before annealing, the metal composite plate 5 may be made into a roll or cut into webs to facilitate subsequent processing or sale. In another embodiment, the step S51 may be performed before the step S5, and the metal composite plate 5 is made into a roll or cut into webs by a user or a manufacturer.

S6, stretching the metal composite plate 5 into a desired pan shape, and using the surface with the concave-convex structure as an inner layer of the pan. Then, surface microarc, sanding, polishing, spraying, handle formation, packaging and other processes are performed on the pan according to the requirements of the pan.

Figure 4:
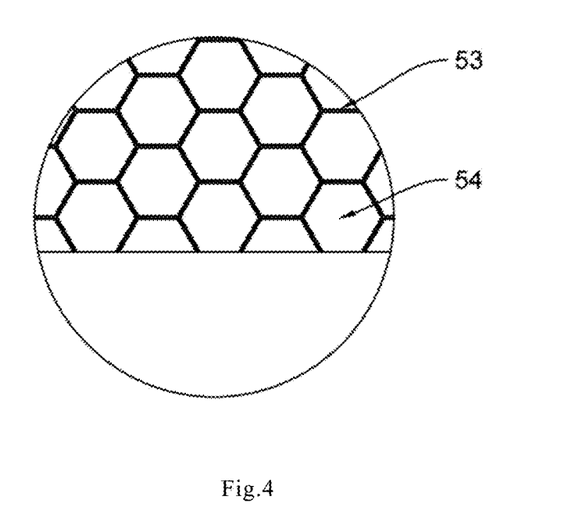
FIG. 4 is an enlarged view at A in FIG. 3.

This embodiment further provides a non-stick pan manufactured by the above process steps. The metal composite plate 5 used has a rectangular configuration, with the concave-convex structure printed on an upper surface and/or lower surface thereof through the process described above. As shown in FIGS. 3 and 4, the concave-convex structure is formed by convex parts 53 and concave parts 54 arranged in a staggered manner, and a non-stick coating is sprayed into the concave parts 54. Apparently, non-stick coatings formed by other means are also within the protection scope of the present disclosure. The metal composite plate 5 is stretched into a pan, with the surface with the concave-convex structure as an inner surface of the pan, and since the convex parts 53 are higher than the concave parts 54, a spatula will contact the convex parts 53 first, thereby avoiding scratching the non-stick coating in the concave parts 54 and extending the service life of the pan.

Figure 5:
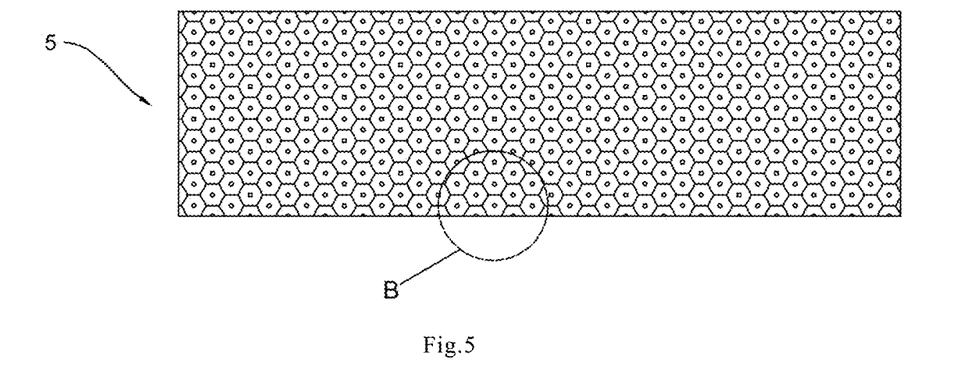
FIG. 5 is a schematic structural diagram of a metal composite plate with another pattern according to an embodiment of the present disclosure.
Figure 6:
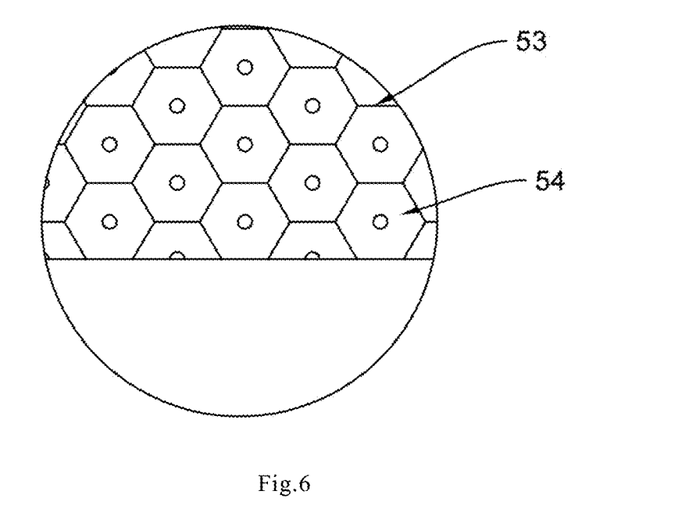
FIG. 6 is a schematic structural diagram at B in FIG. 5.

In this embodiment, the concave parts 54 are uniformly or randomly distributed only on the inner surface of the metal composite plate 5, and a distance between centers of any two adjacent concave parts 54 is between 15 μm and 1.5 mm. If the distance between centers of any two adjacent concave parts 54 is too small, the concave parts 54 may be arranged too densely to be process easily, and the strength of the inner surface of the pan may be affected; and if the distance between centers of any two adjacent concave parts 54 is too large, the concave parts 54 may be arranged too sparsely to store a sufficient amount of oil, and thus the non-stick performance is reduced. In actual use of the pan, on one hand, the concave parts 54 can absorb air and store grease, and produce hot air and oil mist in the heating process to support food, and on the other hand, the concave parts 54 can reduce the contact area between the food and the pan, and enhance the physical non-stick function. In other embodiments, the concave-convex structure may be configured into other forms. As shown in FIGS. 5 and 6, bumps are further provided in the concave parts of the concave-convex structure to provide further protection for the non-stick coating.

Compared with the related art in which the concave-convex structure is formed by etching with a chemical agent, the non-etching knurling process in the embodiment is more environment-friendly. Further, the knurling procedure is preposed in the embodiment so that the metal composite plate 5 does not need to be reheated for knurling. In addition, the annealed metal composite plate 5 has more stable properties, and can be formed with only wider convex patterns instead of thinner convex patterns even further subjected to heating and knurling, resulting in a subsequent manufactured pan with a poor non-stick effect.

Figure 7:
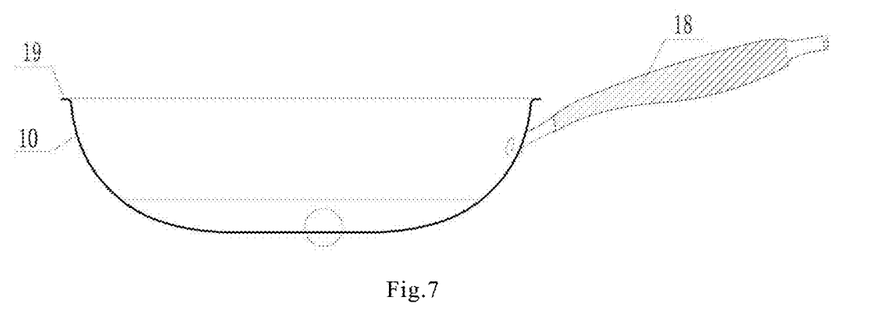
FIG. 7 is an overall schematic structural diagram of a pan body according to an embodiment of the present disclosure.
Figure 8:
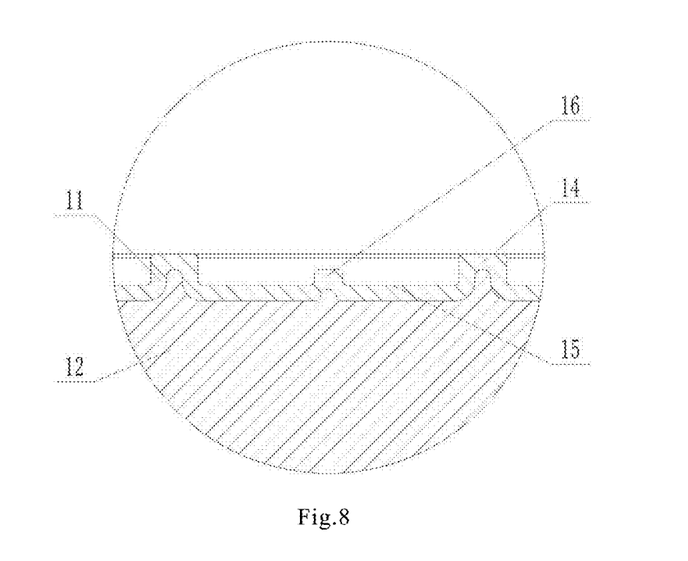
FIG. 8 is a schematic partial view of a titanium-aluminum composite structure adopted in an embodiment of the present disclosure.
Figure 10:
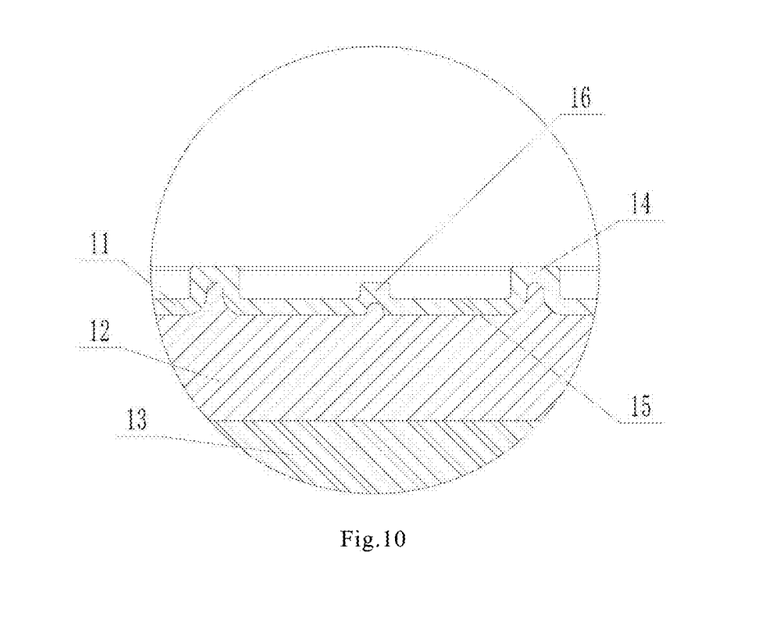
FIG. 10 is a schematic partial view of a titanium-aluminum-steel composite structure according to an embodiment of the present disclosure.

Referring to FIGS. 7, 8 and 10, an embodiment further provides a titanium non-stick pan, including a pan body 10, where a base material of the pan body 10 is a metal composite plate with a multi-layer composite structure including a titanium metal layer formed into an inner layer of the pan body. In this embodiment, the titanium metal layer 11 has a thickness between 0.25 mm and 0.4 mm, and forms a concave-convex structure of a uniform thickness. It should be noted that the uniform thickness here means that the titanium metal layer 11 has the same thickness throughout the whole range of the concave-convex structure. For example, if the thickness of the titanium metal layer 11 is 0.3 mm, each part of the concave-convex structure has a thickness of 0.3 mm, so that the problem that the metal layer is thinner at the concave part 15 formed by etching the inner surface of the pan body 10 than at the convex part (i.e., the thickness varies at different parts) in the related art is avoided. In this manner, the strength and integrity of the pan body 10 can be ensured, and the pan body 10 can be easily stretched into shape during production, thereby improving the yield and quality of the pan body 10 and reducing the waste of titanium caused by etching.

Referring to FIGS. 8 and 10, the concave-convex structure in the embodiment includes a plurality of interconnected concave-convex unit cells, each of which includes first convex parts 14 protruding from an inner surface of the pan body 10 and a concave part 15 enclosed by the first convex parts 14. The concave part 15 further includes a second convex part 16 disposed in the concave part 15, and the second convex part 16 has a top lower than each first convex part 14. A surface of the titanium metal layer 11 at the concave-convex structure forms an oxidation layer 17 with a thickness between 8 μm and 40 μm. When the non-stick pan in this embodiment is used for cooking, the oxidation layer 17 is in direct contact with food.

In actual use, the concave-convex structure on the inner surface of the pan body 10 has a non-stick effect, which is specifically and mainly embodied in the following aspects:

1) The non-stick effect can be achieved by the concave-convex structure itself, where the concave-convex structure can reduce the contact area between the inner surface of the pan body 10 and food, and thereby prevent the food from sticking to the inner surface of the pan body 10.

2) By providing the concave part 15, oil-water and other mixtures preferably enter the concave part 15 in cooking, and when the pan body 10 is heated, high-temperature steam generated by the oil-water can support food from the bottom so that the food is prevented from sticking to the inner surface of the pan body 10.

3) The provision of the second convex part 16 can prevent food of smaller volumes from entering and blocking the concave part 15, and since the second convex part 16 has a height lower than each first convex part 14, a two-layer supporting structure can be formed for the food in cooking, so that the food is prevented from sticking to the bottom of the concave part 15, thereby improving the non-stick effect. In addition, a concave arcuate structure is further formed between the second convex part 16 and the first convex part 14, and since most food is in special shapes, the arcuate unit cell can be better sealed by the food, so that hot air can be more easily produced on the non-stick layer, and the food can be better supported.

4) An oxidation layer 17 is provided, especially on the surfaces of the first convex part 14, the concave parts 15 and the second convex part 16, where the oxidation layer 17 in this embodiment is a titanium dioxide layer formed by micro-arc oxidation on the surface of the titanium metal layer 11, a structure of a plurality of pores is formed inside the oxidation layer 17, and at least part of the pores are communicated with each other. With the structure of the plurality of pores 173 which may be communicated with each other inside the oxidation layer 17, the pores 173 will absorb oil and water molecules in actual cooking, and the mutually communicated structure can further improve the storage capacity for oil and water molecules. In cooking and heating, the oil-water molecules will be evaporated into gas, so that the amount of evaporated gas is increased, food can be better supported, and a better non-stick effect is achieved.

In the step of performing micro-arc oxidation on the surface of the titanium metal layer 11 to obtain a titanium dioxide layer, a single pulse current source is used, with a current density being 1.25 to 1.6A/dm$^2$, a duty cycle being 12% to 15%, and a frequency being 500 Hz.

It can be seen that, in this embodiment, the inner layer of the pan body 10 is configured as a titanium metal layer 11, which can reduce the weight of the pan body 10 and improve the strength and corrosion resistance of the pan body 10; and a concave-convex structure is provided on the titanium metal layer 11 to improve the non-stick effect of the inner surface of the pan body 10 (through the various structures for improving the non-stick effect described above). In addition, the concave-convex structure on the titanium metal layer 11 has a uniform thickness, which is different from the processing method in the related art having the problems of waste of titanium and reduced strength of the pan body 10 caused by removing materials of the pan body 10 by an etching. In actual settings, the thickness of the titanium metal layer 11 in the present disclosure is only 0.25 mm to 0.4 mm, which reduces the titanium consumption by at least 12.5% to 37.5% compared with a titanium non-stick pan processed by the conventional etching method (where the titanium metal layer 11 has a thickness of at least 0.4 mm).

It should be noted that the concave-convex structure in the present disclosure may cover the whole inner surface of the pan body 10, or may be provided partially on the inner surface of the pan body 10.

Figure 11:
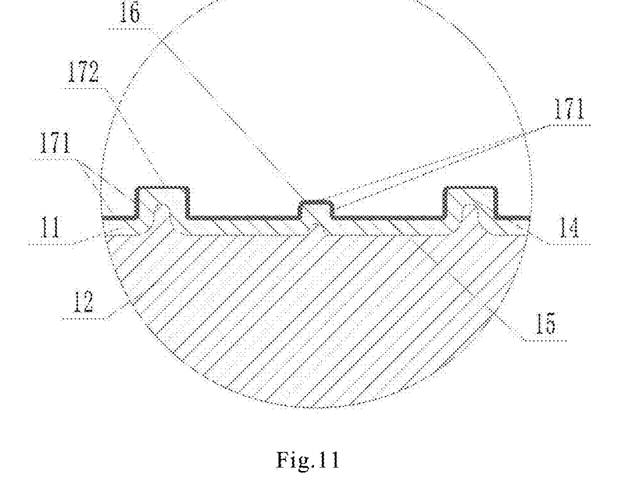
FIG. 11 is a schematic diagram showing distribution of an oxidation layer at a concave-convex structure according to an embodiment of the present disclosure.

Referring to FIG. 11, an oxidation layer 17 according to one embodiment of the present disclosure includes a first oxidation layer 171 formed on bottom and side surfaces of the concave part 15 and top and side surfaces of the second convex part 16, and a second oxidation layer 172 formed on top surfaces of the first convex parts 14. The first oxidation layer 171 has a thickness between 20 μm and 40 μm, and the second oxidation layer 172 has a thickness between 8 μm and 20 μm. After the inner surface of the pan body 10 is oxidized, an inner wall of the pan body 10 is typically polished to remove impurities formed on the inner surface of the pan body 10 during the oxidation process and improve the surface quality of the pan body 10. The polishing process may reduce the thickness of the oxidation layer on the top surfaces of the first convex parts 14 to a certain extent, but since the oxidation layer subjected to micro-arc oxidation is relatively thick, the second oxidation layer 172 of a certain thickness (8 to 20 μm) will still exist on the top surfaces of the first convex parts 14 after polishing in the actual production. In addition, in the polishing process, due to the presence of the first convex parts 14, the surfaces of the concave part 15 and the second convex part 16 will not be polished. In this case, the first oxidation layer 171 on the surfaces of the concave part 15 and the second convex part 16 is thicker, which can produce a better non-stick effect, and since the concave part 15 is a region that provides the majority of the non-stick effect, the whole pan body 10 can achieve a better non-stick effect.

Figure 9:
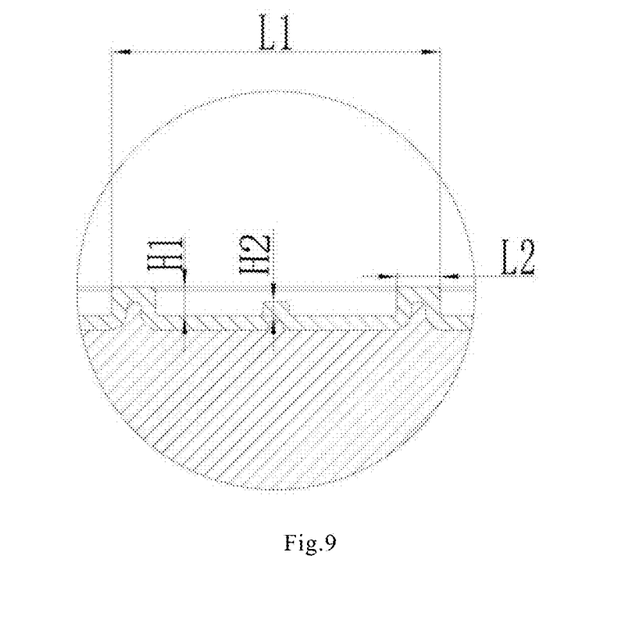
FIG. 9 is a schematic diagram showing sizes of various parts of a concave-convex structure according to an embodiment of the present disclosure.

Referring to FIG. 9, in one embodiment of the present disclosure, the first convex parts 14 are each set to have a width L2=0.2 mm to 0.5 mm, and a height H1=0.08 mm to 0.25 mm. A distance between two points of each first convex part 14 opposite to each other with respect to a center of the concave part 15 is L1=2.5 mm to 3.5 mm. In actual settings, the concave part 15 enclosed by the first convex parts 14 is shaped into a circle or a regular polygon (generally a regular hexagon). When the concave part 15 has a circular shape, a diameter of the concave part 15 is set to 2.5 mm to 3.5 mm; when the concave part 15 has a regular hexagon shape, a spacing between two opposite lines of the concave part 15 is set to 2.5 mm to 3.5 mm.

The oxidation layer 17 in the present disclosure is formed by micro-arc oxidation on the titanium metal layer 11, a structure of a plurality of pores 173 is formed inside the oxidation layer 17, and at least part of the pores 173 are communicated with each other. Compared with an oxide film formed by titanium anodic oxidation, the titanium dioxide oxidation ($TiO_2$) layer 17 formed by micro-arc oxidation on the titanium metal layer 11 is thicker, and has a higher rate of pores 173, higher roughness, and better insulation of film layers. In addition, since the micro-arc oxidation process generally uses higher voltage and current, where the voltage is generally higher than 500V, and processing is performed in a circulated manner with a solution in production, there is no emission and pollution, and a titanium oxidation layer with a hardness up to HV500 to 600, as well as better wear resistance and corrosion resistance, can be obtained.

In contrast, the oxidation film layer produced by titanium anodic oxidation is more compact and thinner (with a thickness of only 0.5 μm to 2 μm), and the voltage and current densities used in the anodic oxidation are relatively low (with a voltage generally between 15V and 100V), so the resulted oxidation film has very low hardness and wear resistance, and generates pollution and emission in the process since the oxidation film is typically manufactured into oxidation film layers for an attractive appearance of the pan body 10. Although theoretically, the thickness of a common titanium anodic oxidated film can reach 10 μm to 20 μm, a long-time oxidation process is required to reach such a thickness, resulting in a low efficiency. Such an anodic oxidated film has compact film layers, and involves a great amount of time and cost to increase the thickness of the oxidation film, which has no contribution to improving the non-stick function. Therefore, in the related art, the surface of the pan is generally processed into a rough surface, and then anodic oxidation is performed on the rough surface to achieve certain non-stick property. Since the resulted anodic oxidated film is thinner (generally with a thickness of only 0.5 μm to 2 μm), when the inner surface of the pan body 10 is polished after oxidation, the anodic oxidated film on the surfaces of the first convex parts 14 will be directly eliminated to expose the base metal material, making food easy to stick to the pan in cooking due to direct contact with the base metal material. If not polished, however, the surface quality of the pan body 10 will be affected.

Figure 13:
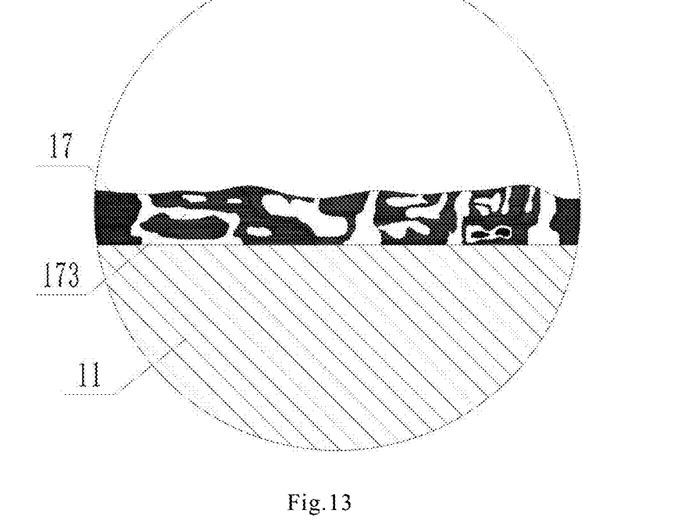
FIG. 13 is a schematic structural diagram showing an interior of an oxidation layer according to an embodiment of the present disclosure.
Figure 14:
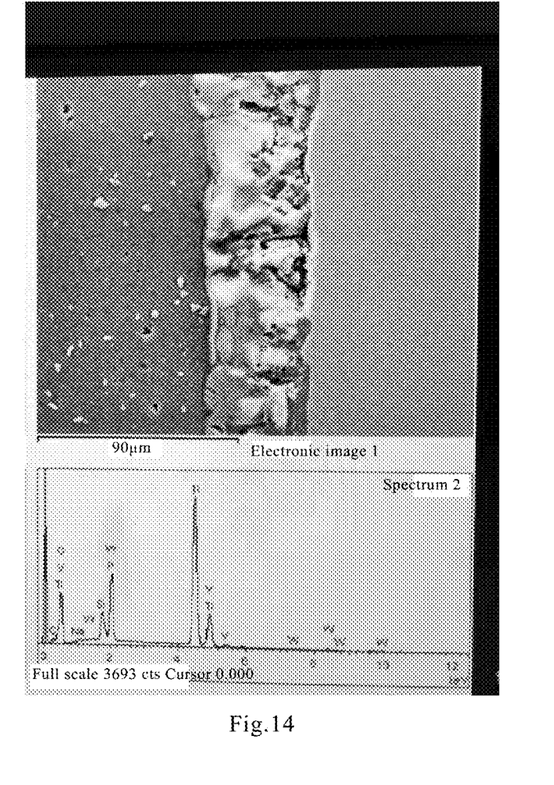
FIG. 14 is a sectional view of an oxidation layer according to an embodiment of the present disclosure.

The oxide film obtained by micro-arc oxidation has a higher rate of pores 173 and a higher roughness, so that the surface of the base material does not need to be roughened in advance. Referring to FIGS. 13 and 8, the oxidation layer 17 formed by micro-arc oxidation is thicker, and has intricate pores 173 inside, and the pores may be further communicated with each other, so that the oxidation layer 17 can store more oil molecules. In cooking and heating, air in the pores 173 are thermally expanded to evaporate the stored oil molecules into oil gas, so that the food can be better supported and better non-stick performance is achieved. Meanwhile, since the oxidation layer 17 obtained by micro-arc oxidation is thicker, the film layer on the top surfaces of the first convex parts 14 can still have a thickness of 8 μm to 20 μm (not less than the thickness of the oxidation layer 17 produced by anodic oxidation) after being polished for attractive reasons, so that a better non-stick effect can be achieved in cooperation with the thicker (20 μm to 40 μm) oxidation layer 17 on the surfaces of the concave part 15 and the second convex part 16.

In the titanium non-stick pan of the present disclosure, the concave part 15 plays a main role in the non-stick effect, and therefore, the areas of the concave part 15 and the first convex part 14 of the non-stick pan have to satisfy certain proportions to ensure a better non-stick effect. In one embodiment of the present disclosure, the first convex parts 14 take a proportion less than 20% relative to a total area of the concave-convex structure, and the concave part 15 takes a proportion not less than 80% relative to the total area of the concave-convex structure. The proportions of the first convex part 14 and the concave part 15 are controlled so that the area of the concave part 15, i.e., the region providing the majority of the non-stick effect, is ensured, thereby improving the non-stick effect. In actual design, the proportion of the first convex part 14 in the total area of the concave-convex structure can be comprehensively controlled by controlling the width and distribution density of the first convex part 14.

Referring to FIGS. 8, 9, 10, 11 and 12, in one embodiment of the present disclosure, the second convex part 16 is disposed at a central position of the concave part 15, and has a diameter between 0.15 mm and 0.2 mm and a height lower than each first convex part 14 by H1−H2=0.05 mm to 0.1 mm. Since the second convex part 16 has a height lower than each first convex part 14, the surface of the second convex part 16 will not be polished when the inner surface of the pan body 10 is polished, so that the oxidation layer 17 on the surfaces of the second concave part 16 and the concave part 15 can be reserved with a complete thickness, where only the oxidation layer 17 on the top surfaces of the first convex parts 14 is partially polished off to improve the surface quality of the pan body 10. In addition, it should be noted that due to the presence of the second convex part 16, a concave arcuate structure is formed between the second convex part 16 and the first convex part 14, which further helps to lift the food and improve the non-stick effect. Apparently, the embodiment in which the second convex part 16 is disposed at a central position of the concave part 15 is a preferred embodiment of the present disclosure, where the second convex part 16 has the same distance to peripheries of the corresponding first convex parts 14, so that the overall appearance and textured feeling of the pan body 10 can be improved. In actual settings, the second convex part 16 may be arranged at a position deviated from the center of the concave part 15, and more than one second convex part 16 may be provided in the convex part 15. It should be noted that, when more than one second convex parts 16 are provided in the convex part 15, the area of the concave part 15 may be appropriately increased, which is equivalent to reducing the area proportion of the corresponding first convex parts 14, and can also achieve a good non-stick effect.

In the present disclosure, the multi-layer composite structure of the pan body 10 may be a titanium-aluminum composite double-layer metal structure, and in this case, a titanium metal layer forms an inner layer of the pan body 10, and an aluminum layer forms an outer layer of the pan body 10; or, the multi-layer composite structure of the pan body 10 may be a titanium-aluminum-steel composite three-layer metal structure, and in this case, the base metal layer 12 is located between a titanium metal layer 11 and a steel metal layer 13, and the metal layers of the pan body 10 from outside to inside are steel, aluminum and titanium in sequence.

In manufacture of the pan body 10 according to the present disclosure, the multiple layers of metal sheets in the composite structure are formed by hot-pressing and compounding, and in the hot-pressing and compounding process, larger metal sheets may be continuously rolled into a plurality of composite metal sheets in accordance with the size of the pan body 10. Since the concave-convex structure is directly pressed in the compounding process, the titanium metal layer 11 on the inner surface of the pan body 10 has a uniform thickness (i.e., various parts of the concave-convex structure have the same thickness) despite the first convex part 14 and the concave part 15 on the inner surface of the pan body 10. In addition, since aluminum is softer than titanium, the titanium metal layer 11 is plastically deformed under a pressure during rolling, and the base metal layer 12 is also deformed accordingly. Before rolling, projections are formed on a surface of the base metal layer 12, and in the rolling process of the base metal layer 12 and the titanium metal layer 11, the projections on the surface of the base metal layer 12 form a mortise and tenon joint structure nested with each other with the concave-convex structure of the titanium metal layer 11. Referring to FIGS. 11 and 6, in this manner, a better bonding force can be achieved between the two metals, the overall effect of the pan body 10 can be improved, and the titanium consumption can be reduced.

The metal sheet formed in this way can use a thinner titanium metal layer 11. In other words, the formed pan has a pattern of a concave-convex structure on the inner surface, a nested structure in the middle, and a back surface freely selected as a surface with a pattern or a flat surface.

Figure 12:
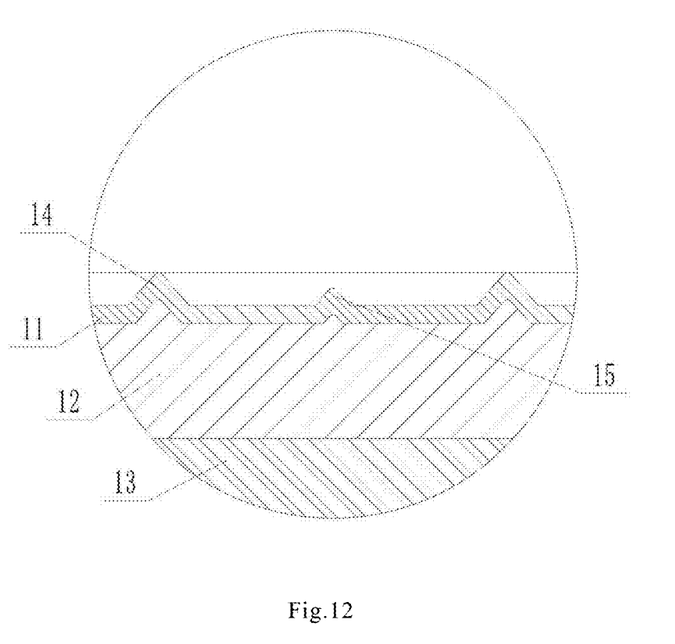
FIG. 12 is a schematic diagram of a concave-convex structure according to an embodiment of the present disclosure.

Referring to FIG. 11, in the present disclosure, the top surfaces of the first convex part 14 and the second convex part 16 in the concave-convex structure may be configured as planar structures. In one embodiment of the present disclosure, tops of each first convex part 14 and/or the second convex part 16 are configured as pointed ends, as shown in FIG. 12. By providing the tops of the first convex part 14 and the second convex part 16 both as pointed ends, the contact area between the food and the pan body 10 is smaller in cooking (compared with the case where the tops of the first convex part 14 and the second convex part 16 are both planar structures), and a better non-stick effect can be achieved. Further, it is conceivable that, in actual design, the tops of the first convex part 14 and the second convex part 16 may be both configured as planar structures or pointed end, or one may be configured as a planar structure and the other as a pointed end. It should be noted that, when the tops of the first convex part 14 and the second convex part 16 are both configured as pointed ends, the width of each first convex part 14 or second convex part 16 refers to a width at a root portion of the part.

Apparently, the pan body 10 of the present disclosure may be further provided with a handle 18, where the handle 18 is made of wood or rubber or any other material with poor thermal conductivity, and detachably connected to the pan body 10. A flange 19 may be further provided at an opening edge of the pan body 10 to improve the overall appearance of the pan, enhances the strength of the pan body 10, and improves safety (avoiding scalding, scratching and the like) in use.

Table 1 shows parameters of titanium non-stick pans according to three different embodiments of the present disclosure, and parameters of a titanium pan in a comparative example.

TABLE 1

| No. | Thickness of titanium metal layer | Current density (A/dm$^2$) | Duty cycle (%) | Frequency (Hz) | Thickness of oxidation layer at concave-convex structure |
|---|---|---|---|---|---|
| Embodiment 1 | 0.25 mm | 1.25 | 12 | 500 | 40 μm |
| Embodiment 2 | 0.4 mm | 1.425 | 13.5 | 500 | 20 μm |
| Embodiment 3 | 0.3 mm | 1.6 | 15 | 500 | 8 μm |
| Comparative example | 0.15 mm | — | — | — | 30 μm |

It should be noted that the oxide layers in embodiments 1 to 3 are formed by micro-arc oxidation, while the oxidation layer of the titanium pan in the comparative example is formed by anodic oxidation.

Test Example

Figure 15:
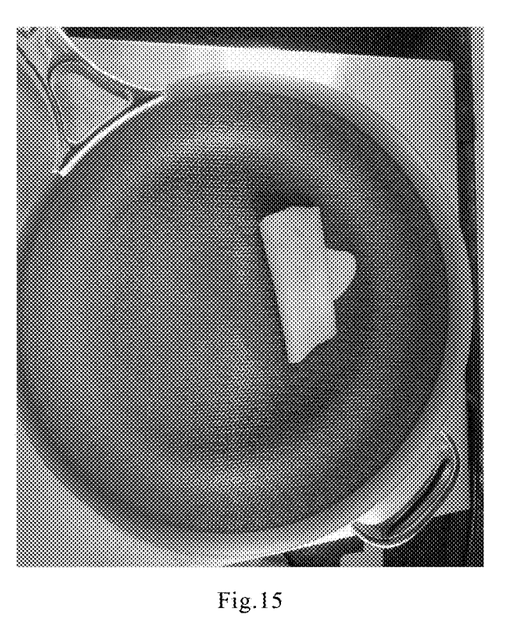
FIG. 15 shows the effect of a titanium non-stick pan in embodiment 1.
Figure 16:
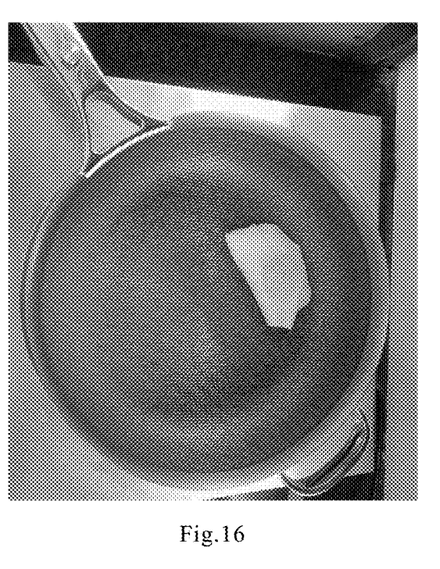
FIG. 16 shows the effect of a titanium non-stick pan in embodiment 2.
Figure 17:
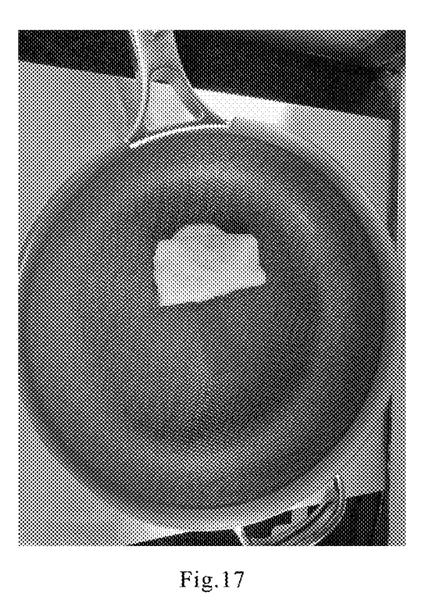
FIG. 17 shows the effect of a titanium non-stick pan in embodiment 3.
Figure 18:
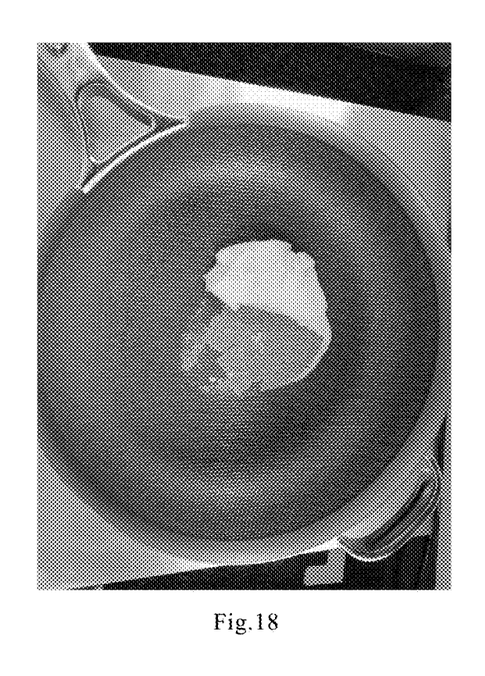
FIG. 18 shows the effect of a titanium pan in a comparative example.

A pan is placed on a gas stove and heated for 2 min, and then a raw egg is added into the pan. FIG. 15 shows the effect of the titanium non-stick pan in embodiment 1; FIG. 16 shows the effect of the titanium non-stick pan in embodiment 2; FIG. 17 shows the effect of the titanium non-stick pan in embodiment 3; and FIG. 18 shows the effect of the titanium pan in the comparative example.

As can be seen from FIGS. 15 to 18, the titanium non-stick pans of embodiments 1 to 3 have less food residue and better non-stick performance, while the titanium non-stick pan of the comparative example has more food residue and poorer non-stick performance.

The above are merely specific implementations of the present disclosure, and the protection scope of the present disclosure is not limited thereto, and it will be understood by those skilled in the art that the present disclosure includes, but is not limited to, the contents given in the drawings and the description of the specific implementations. Any modifications which do not depart from the functional and structural principles of the present disclosure are intended to be included within the scope of the claims.

What is claimed is:

1. A titanium non-stick pan, comprising a pan body, a base material of the pan body is a metal composite plate with a multi-layer composite structure comprising a base metal layer and a titanium metal layer arranged in a stack, the base metal layer is bonded to the titanium metal layer by metallurgical bonding, the titanium metal layer has a thickness between 0.25 mm and 0.4 mm, and forms a concave-convex structure of a uniform thickness, the concave-convex structure comprises a plurality of interconnected concave-convex unit cells, each of which comprises first convex parts protruding from an inner surface of the pan body and a concave part enclosed by the first convex parts, the concave part comprises a second convex part disposed in the concave part, the second convex part has a top lower than each first convex part, and a surface of the titanium metal layer at the concave-convex structure forms an oxidation layer with a thickness between 8 μm and 40 μm.

2. The titanium non-stick pan according to claim 1, wherein the oxidation layer comprises a first oxidation layer formed on bottom and side surfaces of the concave part and top and side surfaces of the second convex part, the oxidation layer further comprises a second oxidation layer formed on top surfaces of the first convex parts, the first oxidation layer has a thickness between 20 μm and 40 μm, and the second oxidation layer has a thickness between 8 μm and 20 μm.

3. The titanium non-stick pan according to claim 1, wherein projections are formed on a surface of the base metal layer, and the metallurgical bonding of the base metal layer and the titanium metal layer enables the projections on the surface of the base metal layer to form a mortise and tenon joint structure nested with each other with the concave-convex structure of the titanium metal layer.

4. The titanium non-stick pan according to claim 1, wherein the first convex parts each have a width between 0.2 mm and 0.5 mm and a height between 0.08 mm and 0.25 mm.

5. The titanium non-stick pan according to claim 1, wherein the oxidation layer is a titanium dioxide layer formed by micro-arc oxidation on the surface of the titanium metal layer, a structure of a plurality of pores is formed inside the oxidation layer, and at least part of the pores are communicated with each other.

6. The titanium non-stick pan according to claim 1, wherein the first convex parts take a proportion less than 20% relative to a total area of the concave-convex structure, and the concave part takes a proportion not less than 80% relative to a total area of the concave-convex structure.

7. The titanium non-stick pan according to claim 1, wherein the second convex part is disposed at a central position of the concave part, and has a diameter between 0.15 mm and 0.2 mm and a height lower than each first convex part by 0.05 mm to 0.1 mm.

8. The titanium non-stick pan according to claim 1, wherein the base metal layer is provided as an aluminum metal layer, and the multi-layer composite structure of the pan body further comprises a steel metal layer at a bottom of the base metal layer.

9. The titanium non-stick pan according to claim 1, wherein the concave part enclosed by the first convex parts is shaped into a circle or a regular polygon.

10. The titanium non-stick pan according to claim 1, wherein tops of each first convex part and/or the second convex part are configured as pointed ends.

* * * * *